United States Patent [19]
Brenden

[11] 3,879,989
[45] Apr. 29, 1975

[54] ULTRASONIC HOLOGRAPHY

[75] Inventor: Byron B. Brenden, Richland, Wash.

[73] Assignee: The Battle Development Corporation, Columbus, Ohio

[22] Filed: Aug. 3, 1966

[21] Appl. No.: 569,914

[52] U.S. Cl. ............... 73/67.5 H; 340/5 H; 350/3.5
[51] Int. Cl. .............................................. G01n 29/04
[58] Field of Search ......................... 73/67.5–67.9, 73/67.5 H, 432 L; 340/5 H; 350/3.5

[56] References Cited
UNITED STATES PATENTS

| | | | |
|---|---|---|---|
| 2,164,125 | 6/1939 | Sokoloff | 340/5 I |
| 2,832,214 | 4/1958 | Trommler | 73/67.6 |
| 3,199,069 | 8/1965 | Lord et al. | 73/67.6 X |
| 3,213,675 | 10/1965 | Goldman | 73/67.5 R |
| 3,213,675 | 10/1965 | Goldman | 73/67.5 |

OTHER PUBLICATIONS

Y. N. Denisyuk, Photographic Reconstruction of the Optical Properties of an Object in its Own Scattered Radiation Field, Soviet Physics, Dec. 1962, p. 543–545.
E. N. Leith et al., Wavefront Reconstruction With Continuous-Tone Objects, J.O.S.A., Dec., 1963, p. 1377–1381.
G. W. Stroke, Lensless Photography, International Science and Technology, May 1965, p. 52–60 & 85.
P. Gregus, Ultrasound Holograms, Research Film, Vol. 5, No. 4, Dec. 1965, p. 330–337.
Leith, E. N. et al., Reconstructed Wavefronts and Communication Theory, J.O.S.A., Vol. 52, No. 10, Oct. 1962, p. 1123–1130.
Cutrona, L. J., Optical Computing Techniques, IEEE Spectrum, Oct. 1964, p. 101–108.
Leith, E. N. et al., Photography By Laser, Scientific American, June 1965, Vol. 212, No. 6, p. 24–35.
Leith, E. N. et al., Holograms: Their Properties and Uses, S.P.I.E. Journal, Oct.–Nov. 1965, Vol. 4, p. 3–6.

*Primary Examiner*—Richard C. Queisser
*Assistant Examiner*—John P. Beauchamp
*Attorney, Agent, or Firm*—Woodcock, Washburn, Kurtz & Mackiewicz

[57] ABSTRACT

In a preferred embodiment disclosed, two ultrasonic beams interfere at a detecting surface capable of supporting standing waves, thereby generating an ultrasonic hologram. A reconstructing light illuminating beam is diffracted by the standing wave pattern of the hologram into at least one image carrying beam for viewing in real time or recordation as a permanent hologram for later viewing.

32 Claims, 13 Drawing Figures

BYRON B. BRENDEN
INVENTOR

BY Gray, Mase and
Dunson, Attorneys

ULTRASONIC HOLOGRAPHY

This invention relates to ultrasonic imaging by wavefront reconstruction. More particularly, it relates to the production of three-dimensional images by forming a hologram of an object with ultrasonic energy and reconstructing a three-dimensional image of the object from the hologram.

Ultrasound is being used for nondestructively inspecting metal plates and tubes for flaws, studying the elastic properties of materials, and examining biological specimens. Most of the present work using ultrasound involves the use of pulse-echo techniques and, as such, produces a one-dimensional pattern which requires considerable experience for proper interpretation. Several methods of imaging ultrasound have been developed, but none are in wide use due either to high cost, slow scan speed, low resoluton, low sensitivity, or other inherent limitations.

Wavefront reconstruction using coherent radiation is described in detail in U.S. pat. application Ser. No. 361,977, filed Apr. 23, 1964, now U.S. Pat. No. 3,506,327 and in U.S. pat. application Ser. No. 503,993, filed Oct. 23, 1965, now U.S. Pat. No. 3,580,655. The holography or wavefront reconstruction process, in its simplest form, includes directing a first beam of coherent light onto an object and positioning a detector (sususally a photographic plate) to receive the light emanating from the object. A second beam of light, coherent with respect to the first beam, is directed at some selected angle to the light emanating from the object and onto the detector causing the light from the object and onto the detector causing the light from the object and the light of the second beam (called a reference beam) to form a pattern of interference fringes at the detector which the detector records. This pattern of interference fringes (called an off-axis hologram) may then be reconstructed to produce a three-dimensional real image or virtual image of the original object. The reconstruction occurs when the off-axis hologram is illuminated with coherent light (under some methods of hologram formation, reconstruction is accomplished with incoherent light). Real and virtual images may be reconstructed on axis or off axis with respect to the off-axis hologram depending upon the choice of angle for the hologram-illuminating light. If the off-axis hologram is reconstructed with coherent light, it is possible to change the size of the images by reconstructing with a wavelength of light (or radiation) that is different than the light used in the hologram-forming step. The waverfront reconstruction process is not limited to visible light since one may use gamma rays, X-rays, ultraviolet, visible, infrared, and microwave radiation, i.e., the entire electromagnetic spectrum. Although ultrasound is a different wave phenomenon than electromagnetic waves, our invention uses ultrasonic energy to produce images based on the principles of wavefront reconstruction.

It is accordingly an object of this invention to produce images by forming a hologram with ultrasonic energy and to reconstruct a visible three-dimensional image from the ultrasonic hologram.

Another object of this invention is to provide a method and apparatus for application in, including but not limited to, nondestructive testing, metallurgical research, and medical research and diagnostics.

Briefly described this invention includes two ultrasonic beams in a liquid medium incident at about the the same area on the surface of the medium which surface may be a liquid-liquid interface, a liquid air interface, or a specialized detector. An object is positioned in one of the ultrasonic beams so that the ultrasonic beam is modified by the object to produce an ultrasonic, object-bearing beam. The unmodified beam, being the reference beam, interferes with the object-bearing beam producing a pattern of standing waves (except in the case of certain detectors described subsequently herein) at the surface of the liquid medium. The pattern of standing waves is a type of transient hologram and is reconstructed with light to produce a visible three-dimensional image of the object.

The light used for reconstructing the hologram need not be coherent light, although coherent light (such as light from a laser) is satisfactory. The requirements for the spectral purity of the light are not great. Unfiltered light from an ordinary light bulb passed through a pinhole is also a satisfactory light source. Thus, one would say that the light is really incoherent or, at most, quasi-coherent.

Many materials, completely opaque to light, are transparent in varying degrees to ultrasound. As a consequence, one advantage of the invention is that it is possible to examine the interior structure of various materials and objects without destroying them.

Another object of this invention is to provide means for recording the transient ultrasonic hologram as a permanent record.

Still another object of this invention is to provide means for detecting the ultrasonic interference pattern in order to form an ultrasonic hologram.

Still another object of this invention is to reconstruct the ultrasonic hologram to provide a visible, usable image.

Other objects and advantages of this invention will be apparent from the description that follows, the drawings and the claims.

Figure 1:
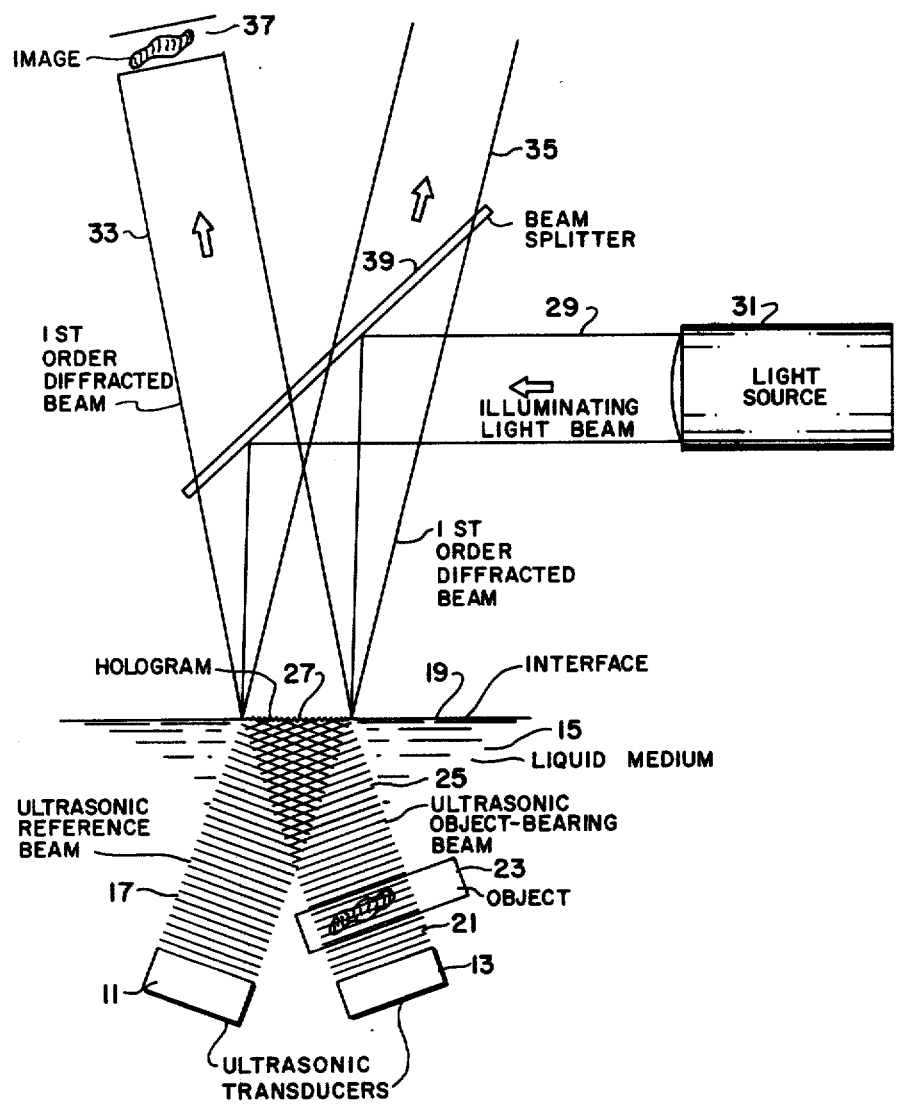
FIG. 1 is a diagram of an embodiment of a method and apparatus for producing an image with ultrasonic holography.

In the drawings, the same reference numerals are applied to identical parts in all embodiments, and such identically numbered parts are substantially identical in structure, function, and operation. Therefore, to eliminate confusing duplication, these parts, their interrelationship and their function, will be described only in conjunction with a single embodiment, such description applying to all embodiments where these parts appear.

FIG. 1 shows a relatively simplified arrangement for producing an image using ultrasonic holography. Preferably, two ultrasonic transducers 11 and 13 are positioned in a liquid medium 15 and a first beam of ultrasonic energy 17 is directed toward the liquid-air interface 19 (the surface of the liquid medium 15). A second beam of ultrasonic energy 21 is also directed toward the interface 19 so that the two beams 17 and 21 overlap as they meet at the interface 19. The object 23 that is selected for imaging is positioned in one of the beams 17 or 21. Once the object 23 is positioned in one of the beams 17 or 21, the beam is modified by the structure of the object 23. In the diagram of FIG. 1, the object 23 is positioned by suitable means (not shown) in ultrasonic beam 21 producing an object-bearing beam 25 and the unmodified ultrasonic beam 17 is the reference beam. The two ultrasonic beams 17 and 25 interfere at the interface 19 to produce a standing wave pattern or hologram 27.

The preferred method of forming the hologram 27 is to use two separate transducers to produce the beams 17 and 21. However, it is possible to form the hologram 27 with only one transducer by replacing one of the transducers, for example transducer 13, with an ultrasonic reflector. The beam 17 is then reflected from the interface to the ultrasonic reflector placed at the position of transducer 13 and reflected through the object 23 to form an object bearing beam 25 that interfers with beam 17 to form a hologram 27.

Another factor to be considered, and not obvious from the drawings, is the power source for the transducers 11 and 13. Both transducers may be connected to the same power source in which case the frequency, phase, and strength of beams 17 and 21 will be substantially equal. The hologram 27 is somewhat improved when the reference beam 17 is slightly less in intensity than the other beam 21. This is accomplished by either putting an attenuator in the circuit to the reference beam transducer (11) or by using separate signal generators. In any event the two beams are maintained substantially in phase. The amount attenuation desired depends upon the transducers that are selected for use and the nature of the object. Although it is ordinarily desirable to have both beams at identical fequencies and phase relationship, good holograms can be produced even if there is some slight mismatch in the frequencies of beams 17 and 21.

When the liquid medium 15 is confined in a tank (as shown in subsequent figures), some surface disturbance may occur if the tank is relatively small in size. One method of reducing the undesirable effects of surface distortions is to include a pulse generator with the signal generator and pulse the transducers to produce the hologram 27 for short periods of time. The pulsed hologram is then photographed or viewed (if the time lapse between pulses is short enough, the retinal retention of the eye makes it appear that the hologram never disappears). Other methos of reducing surface disturbances are to provide specialized detectors (FIGS. 7, 8, and 9), to provide a dampening effect by using two liquid mediums (FIG. 6, FIG. 6A or FIG. 6B), or to cover the surface of the liquid medium 15 with a thin layer of a second liquid medium that has a dampening effect, e.g., oil on water (not shown).

The hologram 27 is reconstructed by illuminating the hologram 27 with a beam 29 of light from a light source 31. The hologram 27 diffracts the light beam 29 into two first order diffracted beams 33 and 35, each carrying an image 37 of the object 23 (only one image 37 is shown in FIG. 1). A zero order beam is also present (not shown in FIG. 1). The light source 31 need be no more coherent than a pinhole illuminated by an ordinary light bulb. A half-silvered mirror acts as a beam splitter 39 to direct the illuminating beam 29 onto the hologram 27 and to separate the diffracted beams 33 and 35 from the illuminating beam 29. The separation of the diffracted beams 33 and 35 is shown as being at a considerable angle in FIG. 1 as a matter of convenience. Actually this is not usually the case and therefore additional steps are necessary, as shown in subsequent figures, in order to view the image 37.

Figure 2:
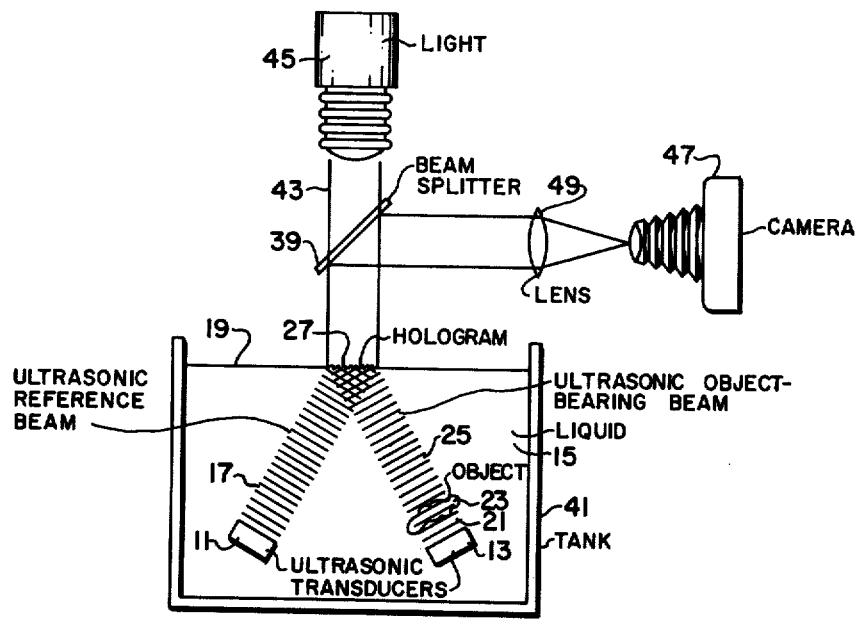
FIG. 2 is a diagram of a method and apparatus for recording an ultrasonic hologram.

FIG. 2 shows a method and apparatus for recording the ultrasonic hologram 27 for subsequent reconstruction. A tank 41 is provided to confine the liquid medium 15. The ultrasonic hologram 27 is produced in the same manner as in FIG. 1 and then illuminated with a light beam 43 from a light source 45 which need not be at all coherent. The image of the ultrasonic hologram 27 is recorded from the reflection in the beam splitter 39 by a camera 47 after being focused by the lens 49. The recorded hologram is in the form of a transparency and is preferably reduced in size by about 40 times to produce a finer line structure than that of the transient hologram 27.

Figure 3:
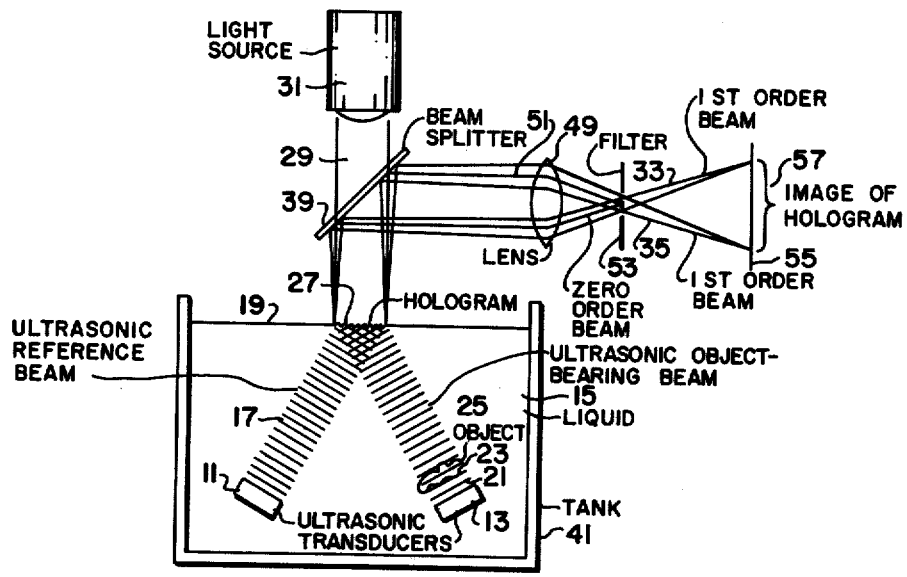
FIG. 3 is a diagram of another embodiment of a method and apparatus for recording an ultrasonic hologram.

Another mehod of recording the ultrasonic hologram 27 is shown in FIG. 3. A light source 31 (such as that described in FIG. 1) passes an illuminating beam 29 through the beam splitter 39 to the hologram 27. The diffracted first order beams 33 and 35 and the zero order beam 51 are reflected to a lens 49 that brings all of the beams 33, 35 and 51 (which overlap) to a point focus at a filter 53. The zero order beam 51 is blocked off and the first order beams 33 and 35 are allowed to pass by the stop or filter 53 to a photographic film 55 and are recorded, preferably as a transparency 55'.

Figure 4:
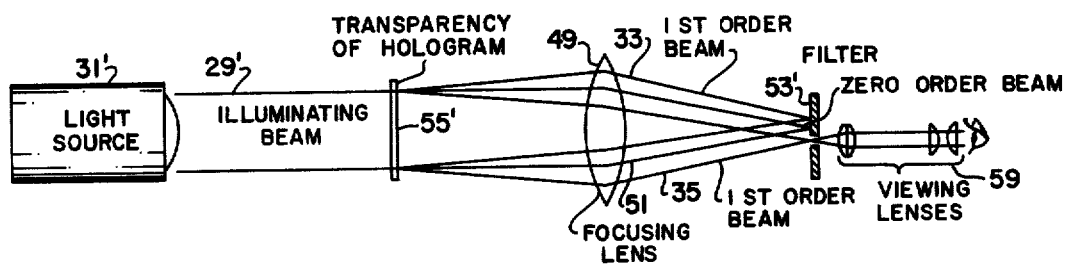
FIG. 4 is a diagram of a method and apparatus for reconstructing a recorded ultrasonic hologram.

The hologram transparency 55', formed as shown in FIGS. 2 or 3, is reconstructed by placing it in an illuminating beam 29' from a light source 31' as shown in FIG. 4. Again the light source 31' need be no more coherent than the light of an ordinary light bulb passing through a pinhole. The hologram transparency 55' diffracts the illuminating beam 29 into two first order beams 33 and 35. The two first order beams 33 and 35 and the undiffracted zero order beam 51 are brought to a point focus at a filter 53'. The filter 53' blocks out one of the first order beams (in the diagram of FIG. 4, beam 33 is blocked off) and the zero order beam 51. The image of the first order beam (beam 35 in FIG. 4) is observed with the viewing lenses 59.

Figure 5:
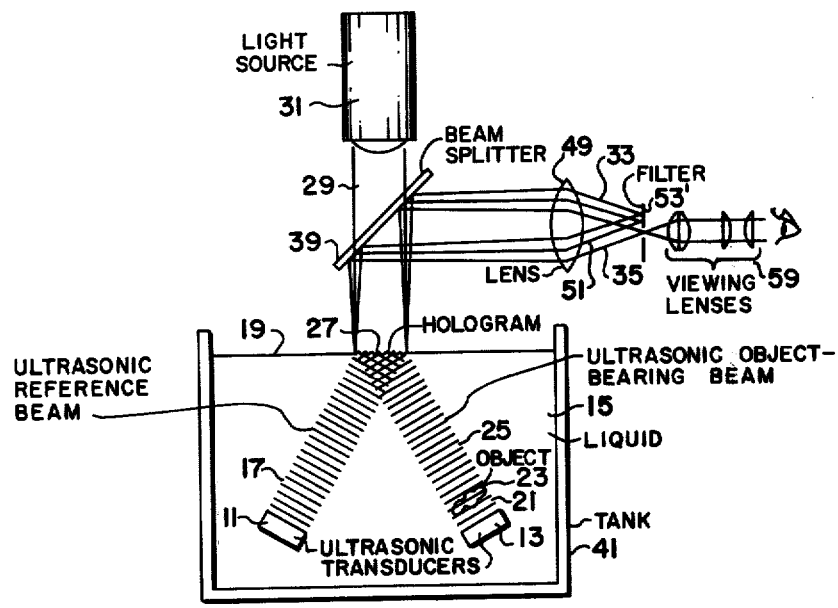
FIG. 5 is a diagram of a method and apparatus for direct viewing of the ultrasonic hologram.

FIG. 5 shows a method of viewing the image of the object 23 directly from the transient, ultrasonic hologram 27. The hologram 27, formed in the previously discussed manner (as in FIG. 1), is illuminated by a light beam 29 from a light source 31 (such as that described in connection with FIG. 1). The diffracted beams 33 and 35 and the zero order beam 51 are reflected by the beam splitter 39 to a lens 49 and brought to a point focus at the filter 53'. The filter 53' blocks off all but one first order beam (35) and the image is viewed directly with the viewing lenses 59 (preferably in the form of a telescope).

Figure 6:
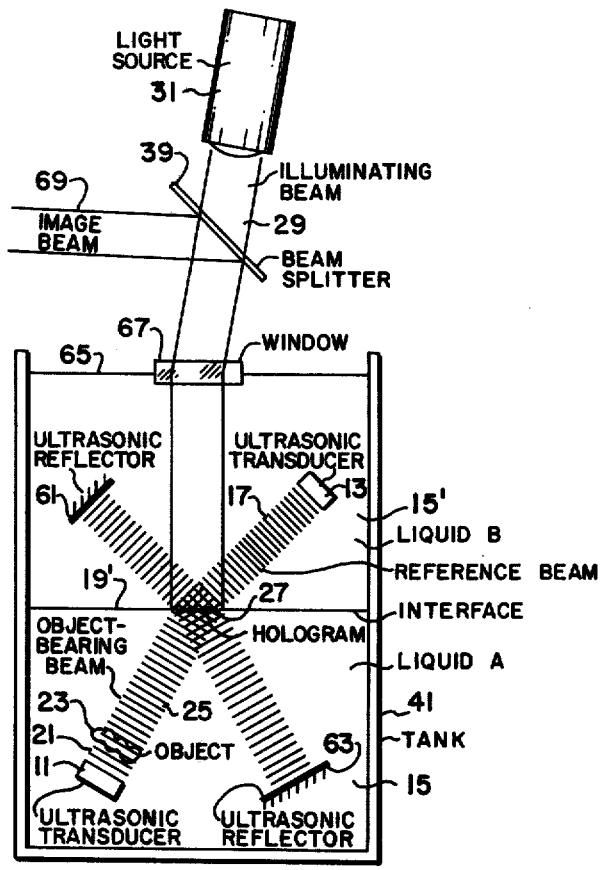
FIG. 6 is a diagram of another embodiment of a method and apparatus for producing an image with ultrasonic holography.
Figure 6B:
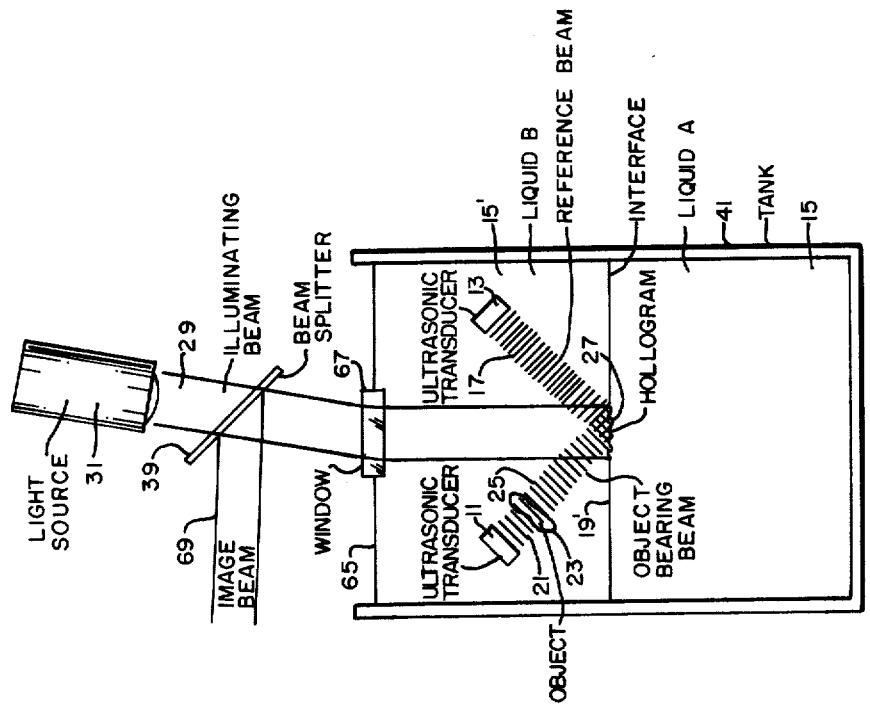
FIG. 6B is a diagram of another embodiment of a method and apparatus for producing an image with ultrasonic holography.
Figure 6A:
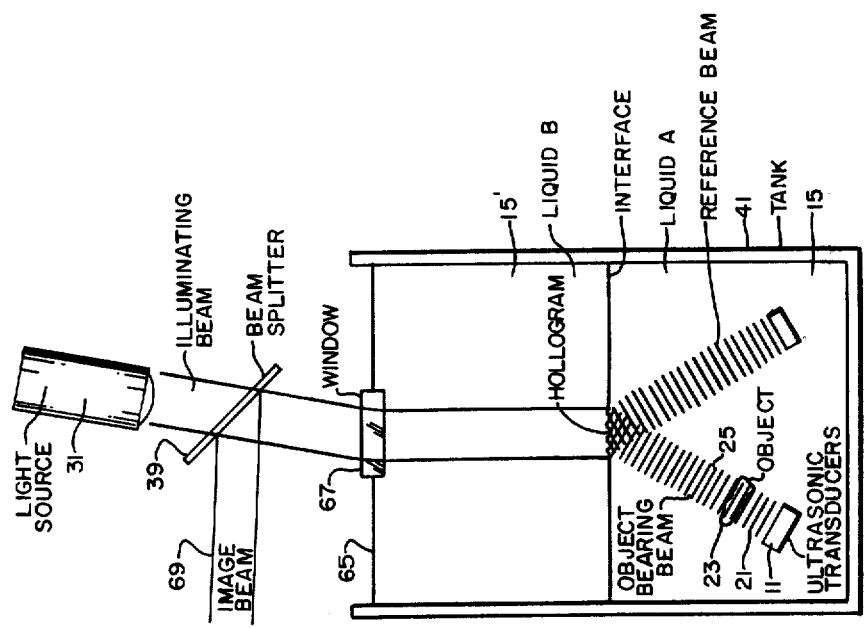
FIg. 6A is a diagram of another embodiment of a method and apparatus for producing an image with ultrasonic holography.

A liquid to liquid interface 19' may also be used to form the ultrasonic hologram 27 as shown in FIG. 6. The transducer 11 is positioned in the first liquid 15 (or liquid A) and in this instance produces ultrasonic beam 21 which is transmitted through the object 23 to form the object-bearing beam 25. The transducer 13 (which could also be arranged in the first liquid with transducer 11 as in FIGS. 1, 2, 3, or 5 and as specifically shown in FIG. 6A) is positioned in a second liquid 15' (or liquid B) which is less dense than and immiscible with the first liquid 15. The transducer 13 produces the reference beam 17 directed to interfere with the object-bearing beam 25 at the interface 19' between liquids 15 and 15'. The interference pattern of the ultrasonic beams 17 and 25 forms the hologram 27. Similarly, as shown in FIG. 6B, the transducer 11 may be arranged in the second liquid 15' with the transducer 13 so that both beams of ultrasonic energy are maintained in the second liquid medium. FIG. 6 also shows a force-balancing arrangement wherein the reference beam 17 is reflected from the interface 19' to an ultrasonic reflector 61 and re-reflected back to the interface 19'. The object-bearing beam 25 is also reflected from the interface 19' to an ultrasonic reflector 63 and re-reflected back toward the interface 19'. In FIG. 6 the ultrasonic transducer 11 which is placed in the lower liquid directs a beam of ultrasonic energy onto the interface between liquid A and liquid B and ultrasonic transducer 13 placed in the upper liquid directs energy onto the interface from above. Each ultrasonic beam which is directed at an angle to a liquid interface would produce a net force on this liquid interface. This net force can be divided into its vertical and horizontal components. It is desirable to balance these forces, and this can be accomplished by the configuration shown in FIG. 6. The power of the transducers 13 and 11 are adjusted so that the vertical component of the force at the interface is balanced. The lateral or horizontal components of the force are then balanced by use of the reflectors 61 and 53. The ultrasonic energy from the object bearing-beam 25 is reflected from the interface to the ultrasonic reflector 63 and thence back to the interface. Similarly, the reference beam 17 that is incident upon the interface is reflected therefrom onto the ultrasonic reflector 61 and then back onto the interface. Thus, there are four ultrasonic beams incident upon the liquid interface and each of these beams has horizontal and vertical force component. By appropriate adjustment of (1) the transducer powers, (2) the location of the reflectors and (3) the angle of incidence of the reference and object beams, the net forces on the interface between liquids A and B can be minimized or eliminated.

The hologram 27 of FIG. 6 may be recorded (as in FIGS. 2 and 3) or viewed directly (as in FIG. 5). However, there are undesirable reflections from the surface 65 of the liquid 15'. In order to eliminate such reflections, a window 67, of suitable material such as glass, is positioned in the liquid surface 65 at a slight tilt. The illuminating beam 29 (or 43) is passed through the beam splitter 39, window 67 and the liquid 15' to the hologram 27. An image beam 69 is reflected from the beam splitter 39 and may be photographed, filtered and recorded, or viewed directly as previously describe. Two typical liquids are freon for liquid 15 and water for liquid 15'.

Figure 7:
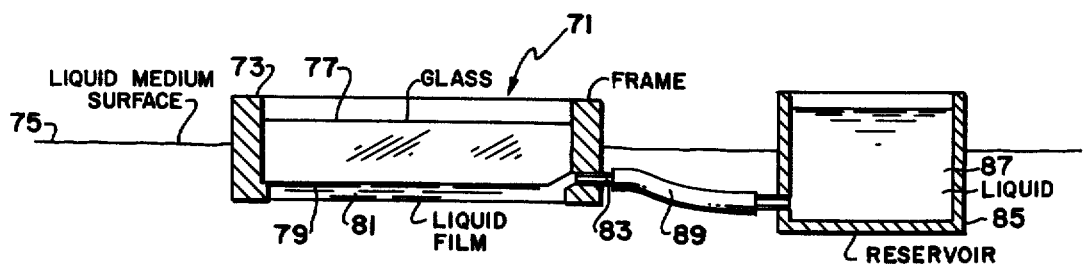
FIG. 7 is a drawing of apparatus for detecting an ultrasonic interference pattern to form an ultrasonic hologram.

FIG. 7 shows apparatus for isolating the ultrasonic hologram 27 from the surface 19 of the liquid medium. The detector 71 includes a frame 73 that is immersable in the liquid medium surface 19 or 75. A transparent window 77, such as glass, is positioned inside of the frame 73 leaving a recess 79 beneath the window 77. A liquid film 81, such a soil, is supplied to the recess 79 through a port 83 in the frame 73. A reservoir 85 supplies the liquid 87 for the film 81 through a tube 89. The thickness of the film 81 may be controlled by the level of the liquid 87 in the reservoir 85.

Figure 8:
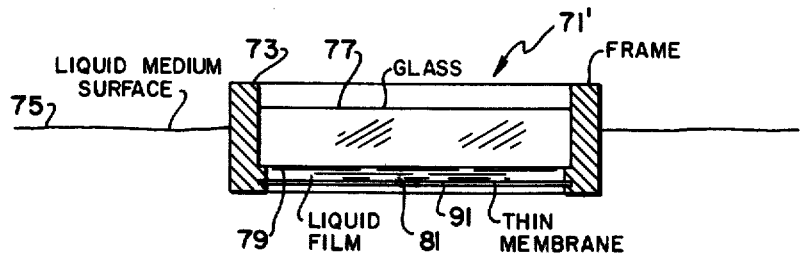
FIG. 8 is a drawing of another embodiment of apparatus for detecting an ultrasonic interference pattern to form an ultrasonic hologram.

FIG. 8 shows a detector 71' that is quite similar to that of FIG. 7. However, instead of supplying the liquid from a reservoir, the liquid film 81 is entrapped in the recess 79 by a thin membrane 91. The liquid film 81 receives the force of the ultrasonic energy and the film distorted is distored into a standing wave pattern to form a hologram 27.

Figure 9:
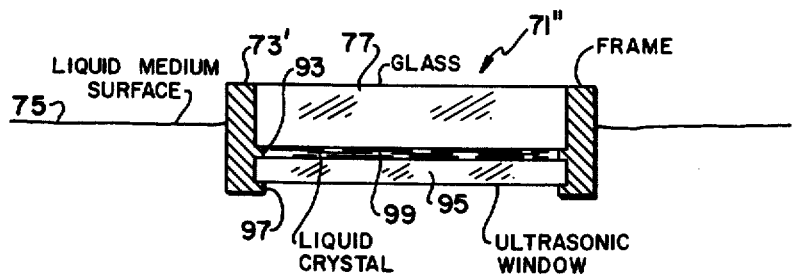
FIG. 9 is a drawing of another embodiment of apparatus for detecting an ultrasonic interference pattern to form an ultrasonic hologram.

FIG. 9 shows a detector 71" that makes use of the unique properties of substances known as "liquid crystals". One property of cholesteric liquid crystals is that they are optically active, i.e., they rotate the plane of polarization of light which passes through them. The rotation may be as much as 18,000° per millimeter of travel. In FIG. 9 the frame 73' has a glass window 77 supported by a ridge 93 on the inner wall. A second transparent plate 95 is supported by another ridge 97 on the frame 73'. The liquid crystal 99, such as cholesterol chloride is disposed between the plates 77 and 95. When the layer of liquid crystal 99 is irradiated by two ultrasonic beams, variations in thickness corresponding to variations in ultrasonic intensity are developed. Plane polarized light is transmitted through the irradiated thin layer of liquid crystal 99 and variations in the rotation of the plane of polarization are produced in accordance with the distribution of intensity in the interfering ultrasonic beams giving rise to diffraction of the transmitted light.

Optical activity is not the only property of liquid crystals that can be used in ultrasonic holography. The molecular structure of a cholesteric liquid crystal is very delicately balanced and is easily upset. Any small disturbance, such as irradiation with ultrasound, interferes with the weak forces between the molecules producing marked changes in such optical properties as reflection, transmission, birefringence, circular dichroism, optical activity and color. Thus, the interference of two ultrasonic beams causes alternating regions in the film of liquid crystal 99 wherein the liquid-crystal material is transformed into a liquid that displays no optical activity. Polarized light passed through the transformed film layer is diffracted satisfactorily for imaging of an object placed in one of the ultrasonic beams.

Figure 10:
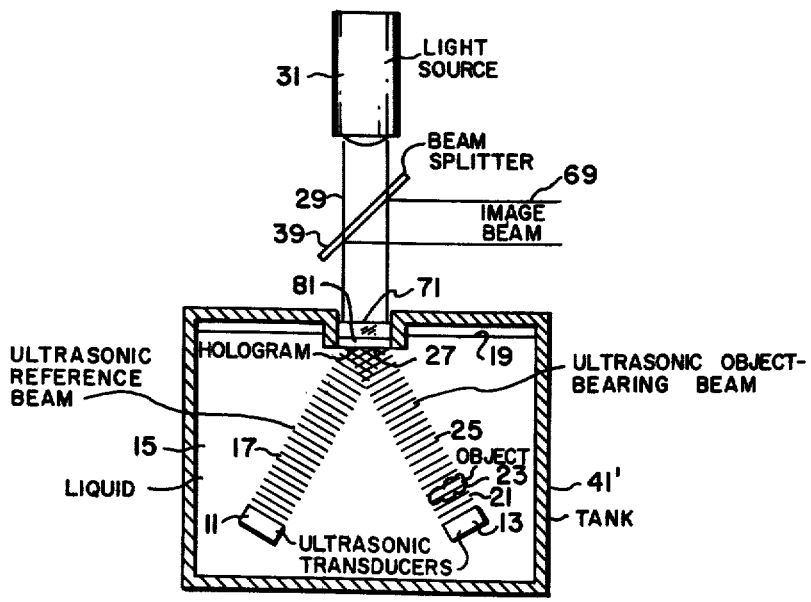
FIG. 10 is a diagram of a method and apparatus utilizing the detectors of FIGS. 7 and 8.

FIG. 10 shows the detector 71 (or 71') in use. The tank 41' is constructed to suspend the detector 71 just below the surface 19 of the liquid medium 15. The reference beam 17 and the object-bearing beam 25 are directed to interfere at the liquid film 81. An illuminating beam 29 from a light source 31 is directed through the beam splitter 39 to the hologram 27 (formed in the liquid film 81 and an image beam 69 is reflected from the beam splitter 39. The reflection from the hologram 27 may be recorded as a transparency (according to FIGS. 2 or 3) or reconstructed (according to FIG. 5).

Figure 11:
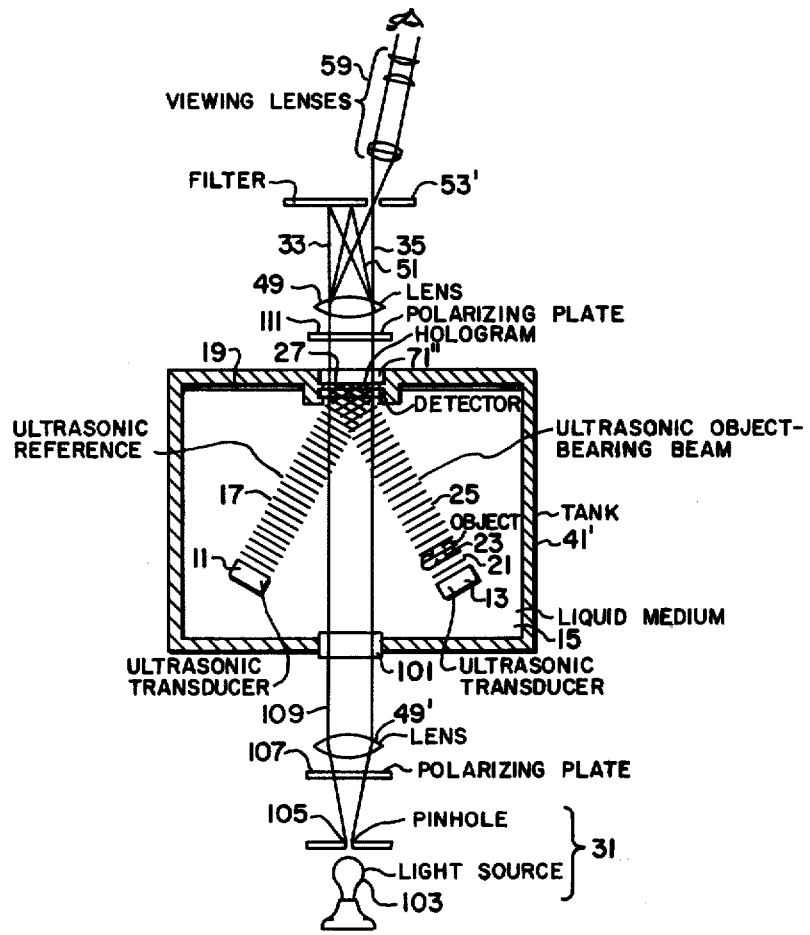
FIG. 11 is a diagram of a method and apparatus utilizing the detector of FIG. 9.

FIG. 11 shows the detector 71'' in use. The apparatus for producing the ultrasonic interference pattern is arranged as previously described. The detector 71'' is positioned in tthe tank 41' at the area where the ultrasonic reference beam 17 and the ultrasonic object-bearing beam 25 cross. A window 101 is provided in the tank 41'. A light source 31 (such as a light bulb 103 and pinhole 105) is directed through a polarizing plate 107 and collimated by a lens 49'. The incident beam 109 passes through the liquid medium 15 and is transmitted through the hologram 27. The diffracted beams are passed through a polarization plate 111 and brought to a point focus by a lens 49 at the filter 53'. One first order beam (33) is blocked off along with the zero order beam 51 so that the image of the object in the other first order beam (35) may be observed with the viewing lenses 59. The hologram 27 may also be recorded on film (as in FIGS. 2 or 3) when convenient.

It should be noted that a number of materials are available for the liquid medium. The selection depends on their conductivity (to transfer heat from the ultrasonic transducers), their ability to conduct ultrasound, their reflectivity at the surface, and their ability to produce a standing wave, i.e., surface tension. Selection depends on the best combination of the above-named characteristics. For example, in some mediums the standing wave may be pronounced but the heat conduction may be poor.

It will be understood of course that, while the forms of the invention herein shown and described constitute preferred embodiments of the invention, it is not intended to illustrate all possible forms of the invention. It will also be understood that words used are words of description rather than of limitation and that various changes may be made without departing from the spirit and scope of the invention herein disclosed.

What is claimed is:

1. A method of producing three-dimensional images with ultrasonic energy comprising the steps of:
   a. directing a first beam of ultrasonic energy toward the surface of a liquid medium;
   b. positioning an object between the source of said first beam of ultrasonic energy and said surface;
   c. directing a second beam ultrasonic energy to interfere with said first beam of ultrasonic energy at an angle at said surface to form an ultrasonic hologram, said first and second beams having substantially the same frequency; and
   d. reconstructing a three-dimensional image of said object from said ultrasonic hologram by illuminating said ultrasonic hologram with light and blocking off one first order diffracted beam and the zero order beam, said three-dimensional image being viewable in the remaining first order diffracted beam.

2. A method of producing a hologram comprising the steps of:
   a. directing a first beam of ultrasonic energy toward the surface of a liquid medium;
   b. positioning an object between the source of said first beam of ultrasonic energy and said surface;
   c. directing a second beam of ultrasonic energy to interfer with said first beam of ultrasonic energy at an angle at said surface thereby generating a pattern of standing waves on said surface, said first and second beams having the same frequency;
   d. illuminating said pattern of standing waves with light;
   e. directing the diffracted first order beams and the zero order beam reflected from said pattern of standing waves to a filter and filtering out the zero order beam; and
   f. focusing and recording said diffracted first order beams on film producing a hologram transparency.

3. A method of producing three-dimensional images with ultrasonic energy comprising the steps of:
   a. directing a first beam of ultrasonic energy toward the surface of a liquid medium;
   b. positioning an object between the source of said first beam of ultrasonic energy and said surface;
   c. directing a second beam of ultrasonic energy to interfere with said first beam of ultrasonic energy at an angle at said surface thereby generating a pattern of standing waves on said surface, said first and second beams having the same frequency;
   d. recording said pattern of standing waves on film; and
   e. reconstructing a three-dimensional image of said object from the recorded pattern of standing waves by illuminating said recorded pattern of standing waves with light and blocking off one first order diffracted beam and the zero order beam, said three-dimensional image appearing in the remaining first order beam.

4. Apparatus for producing three-dimensional images with ultrasonic energy comprising:
   a. means for generating ultrasonic energy beneath the surface of a liquid medium to produce a first beam of ultrasonic energy directed toward an object and thence toward the surface of the liquid medium;
   b. means for generating ultrasonic energy beneath the surface of the liquid medium for producing a second beam of ultrasonic energy directed to interfere with said first beam of ultrasonic energy at an angle at the surface of the liquid medium to produce a pattern of standing waves, the first and second beams having substantially the same frequency;
   c. a point light source directed to illuminate said pattern of standing waves;
   d. a lens positioned to bring the reflected light beams from the illuminated standing wave pattern to a point focus; and
   e. means for blocking out one focused first order beam and the focused zero order beam to permit observation of the three-dimensional image of the object in the unblocked first order beam.

5. A method of producing a hologram comprising the steps of :

a. directing a first beam of ultrasonic energy toward the interface of a first liquid medium and a second liquid medium, said second liquid medium being less dense and immiscible with said first liquid medium;

b. positioning an object between the source of said first beam of ultrasonic energy and said interface; and c. directing a second beam of ultrasonic energy to interfere with said first beam of ultrasonic energy at an angle at said interface generating a standing wave pattern at said interface in the form of a hologram, said first and second beams having substantially the same frequency.

6. A method of producing a hologram in accordance with claim 5 wherein the first and second beams of ultrasonic energy are both maintained in said first liquid medium.

7. A method of producing a hologram in accordance with claim 5 wherein the first and second beams of ultrasonic energy are both maintained in said second liquid medium.

8. A method of producing a hologram in accordance with claim 5 wherein the first and second beams of ultrasonic energy are maintained in different liquid mediums.

9. A method of produing a hologram in accordance with claim 5 wherein the first and second beams of ultrasonic energy are in different liquid mediums and the reflection of said first ans second ultrasonic beams from the interface are re-reflected toward the interface with ultrasonic reflectors.

10. Apparatus for producing ultrasonic holograms comprising:

a. means for generating ultrasonic energy beneath the surface of liquid medium to produce a first beam of ultrasonic energy directed toward an object and thence toward the surface of the liquid medium;

b. means for generating ultrasonic energy beneath the surface of the liquid medium for producing a second beam of ultrasonic energy directed to interfere with said first beam of ultrasonic energy at an angle at the surface of the liquid medium, the first and second beams having substantially the same frequency; and c. a detector immersed in the surface of said liquid medium and positioned to receive the interference maxima and minima of said two beams of ultrasonic energy producing a pattern of standing waves.

11. Apparatus for producing an ultrasonic hologram comprising:

a. a liquid medium;

b. a detector immersed in the surface of said liquid medium, said detector including a distortable liquid layer;

c. a first transducer in said liquid medium positioned to direct a first beam of ultrasonic energy to an object and thence to said distortable liquid layer;

d. a second transducer in said liquid medium positioned to direct a second beam of ultrasonic energy to intersect said first beam at said distortable liquid layer at an angle with respect to said first beam, said first and second beams having substantially the same frequency whereby the interference of said first beam of ultrasonic energy and said second beam of ultrasonic energy produces an ultrasonic interference pattern in said distortable liquid layer.

12. Apparatus for producing a hologram in accordance with claim 11 wherein said distortable liquid layer is a thin film of oil.

13. Apparatus for producing a hologram in accordance with claim 11 wherein said distortable liquid layer is a liquid crystal.

14. Apparatus for producing a hologram in accordance with claim 11 wherein said distortable liquid layer is a thin film of liquid entrapped in part between a glass plate and a thin membrane.

15. A method of producing a hologram of an object with ultrasonic energy comprising the steps of:

a. directing a first beam of ultrasonic energy to an object and thence through a coupling medium to a hologram detecting plane responsive to ultrasonic energy; and b. directing a second beam of ultrasonic energy through a coupling medium to interfere with said first beam of ultrasonic energy at an angle at said hologram detecting plane to form an ultrasonic hologram, said first and second beams having substantially the same frequency.

16. A method of producing a hologram of an object with ultrasonic energy comprising the steps of:

a. directing a first beam of ultrasonic energy to an object positioned within a liquid medium, said beam then passing from the object to the surface of the liquid medium; and b. directing a second beam of ultrasonic energy to said surface of said liquid medium to interfere with said first beam of ultrasonic energy at an angle at said surface to form an ultrasonic hologram, said first and second beams having substantially the same frequency;

17. A method of producing an ultrasonic hologram comprising the steps of:

a. directing a first beam of ultrasonic energy to an object and thence through a coupling medium to a hologram detectng surface;

b. directing a second beam of ultrasonic energy through a coupling medium to interfere with said first beam of ultrasonic energy at an angle at said hologram detecting surface thereby generating a pattern of standing waves on said detecting surface in the form of an ultrasonic hologram, said first and second beams having the same frequency; and c. recording said pattern of said standing waves.

18. A method of producing an ultrasonic hologram comprising the steps of:

a. directing a first beam of ultrasonic energy to an object positioned within a liquid medium, said beam then passing from the object to the surface of the liquid medium;

b. directing a second beam of ultrasonic energy to said surface of said liquid medium to interfere with said first beam of ultrasonic energy at an angle at said surface thereby generating a pattern of standing waves to form an ultrasonic hologram, said first and second beams having the same frequency; and c. recording said pattern of standing waves.

19. A method of producing an ultrasonic hologram comprising the steps of:

a. directing a first beam of ultrasonic energy to an object positioned within a coupling medium;

b. directing a second beam of ultrasonic energy through said coupling medium to interfere with said first beam of ultrasonic energy at an angle at an ultrasonic detecting plane after said first beam leaves said object to generate at said plane an interference pattern in the form of an ultrasonic hologram, said first and second beams having the same frequency; and c. recording said pattern.

20. A method of producing an image of an object with ultrasonic energy, comprising the steps of:

directing a first beam of ultrasonic energy to an object and thence through a coupling medium to a hologram detecting surface capable of supporting a standing wave;

directing a second beam of ultrasonic energy through the coupling medium to interfere with said first beam of ultrasonic energy at an angle at said hologram detecting surface to form a standing wave ultrasonic hologram, said first and second beams having substantially the same frequency; and concurrently illuminating the standing wave with light in a manner to produce various diffrated and undiffracted light beams including a desired image carrying diffracted beam.

21. A method according to claim 20 wherein the step of directing a first beam of ultrasonic energy to an object includes passing said ultrasonic energy through said object and thence to a hologram detecting surface capable of supporting a standing wave.

22. A method according to claim 20 wherein the steps of directing first and second beams of ultrasonic energy include pulsing the generation of said beams.

23. A method according to claim 20 which comprises the additional step of separating said desired image carrying diffracted beam from the other of said various diffracted and undiffracted light beams.

24. A method according to claim 23 which comprises the additional steps of placing viewing optics in said desired image carrying diffracted beam and focusing said optics upon a three-dimensional image of said object.

25. A method according to claim 23 wherein the step of separating said desired image carrying beam from said various diffracted and undiffracted light beams includes bringing said diffracted and undiffracted light beams to focus at various points, and further includes blocking undesired diffracted and undiffracted light beams at their respective focal points while allowing said desired image carrying diffracted beam to pass.

26. The method according to claim 20 which comprises the additional step of blocking all light beams diffracted and undiffracted by the standing wave except for said desired image carrying diffracted beam.

27. A method of producing an optical image of an object as seen by ultrasonic energy, comprising the steps of:

directing a first beam of ultrasonic energy to an object within a coupling medium for modification thereby into an object-bearing beam;

directing a second beam of ultrasonic energy through the coupling medium to intersect said object-bearing beam at an angle at an ultrasonic detecting surface, thereby generating an ultrasonic energy maxima and minima interference pattern across said surface common to both the object bearing and second ultrasonic beams, said first and second beams having substantially the same frequency;

detecting the ultrasonic energy maxima and minima interference pattern;

modulating reconstructing light with said detected pattern to produce various diffracted and undiffracted light beams including at least one desired image carrying beam; and separating said at least one desired image carrying beam from said various diffracted and undiffracted light beams.

28. A method according to claim 27 wherein the step of separating said at least one desired image carrying beam from said various diffracted and undiffracted light beams includes blocking all diffracted and undiffracted light beams except for said at least one desired image carrying beam.

29. A method of periodically producing an ultrasonic hologram, comprising the steps of:

directing a first beam of ultrasonic energy to an object within a coupling medium and thence to a hologram detecting surface capable of supporting a standing wave;

directing a second beam of ultrasonic energy through the coupling medium to interfere with said first beam of ultrasonic energy at an angle at said hologram detecting surface to form a standing wave ultrasonic hologram, said first and second beams having substantially the same frequency; and pulsing the generation of said first and second beams of ultrasonic energy with a time lapse between pulses short enough to make it appear to the human eye that the hologram is persistent.

30. A method of producing a hologram of an object, immersed in a liquid coupling medium, with ultrasonic energy comprising the steps of:

directing a first beam of ultrasonic energy through the coupling medium to the object and thence through the coupling medium to a hologram detecting surface responsive to the ultrasonic energy, and directing a second beam of ultrasonic energy coherent with said first beam through the coupling medium to intersect said first beam at said hologram detecting surface at an angle with respect to said first beam, said second beam interfering with said first beam at said surface to form an ultrasonic hologram.

31. A method of producing a hologram of an object according to claim 30 including the additional step of reconstructing an image of said object from said ultrasonic hologram.

32. A method of producing a hologram of an object according to claim 30 including the additional step of recording said ultrasonic hologram.

* * * * *